(12) United States Patent
Alexis et al.

(10) Patent No.: US 12,218,910 B2
(45) Date of Patent: *Feb. 4, 2025

(54) AUTOTUNING A VIRTUAL FIREWALL

(71) Applicant: Juniper Networks, Inc., Sunnyvale, CA (US)

(72) Inventors: Antony Ruban Alexis, Bangalore (IN); Sai Prashanth Ramanathan, Bangalore (IN); Ramasubramaniam Ganesan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,470

(22) Filed: Sep. 11, 2023

(65) Prior Publication Data

US 2023/0421534 A1 Dec. 28, 2023

Related U.S. Application Data

(63) Continuation of application No. 18/046,232, filed on Oct. 13, 2022, now Pat. No. 11,863,524, which is a (Continued)

(30) Foreign Application Priority Data

Apr. 11, 2020 (IN) .............................. 202041015775

(51) Int. Cl.
*H04L 9/40* (2022.01)
*G06F 9/455* (2018.01)
(Continued)

(52) U.S. Cl.
CPC ...... *H04L 63/0218* (2013.01); *G06F 9/45558* (2013.01); *H04L 41/0823* (2013.01);
(Continued)

(58) Field of Classification Search
CPC ....... H04L 41/08–0833; H04L 41/0893–0895; H04L 41/22; H04L 63/02–029
See application file for complete search history.

(56) References Cited

U.S. PATENT DOCUMENTS 8,276,140 B1 9/2012 Beda, III et al.
8,843,925 B1 9/2014 Beda, III et al.
(Continued)

FOREIGN PATENT DOCUMENTS

CN 104247332 A 12/2014
CN 104518897 A 4/2015
(Continued)

OTHER PUBLICATIONS

Barracuda Networks, Inc., "Best Practice—Performance Tuning on VMware Hypervisors," Apr. 17, 2018, 4 pages.
(Continued)

*Primary Examiner* — Brendan Y Higa
(74) *Attorney, Agent, or Firm* — Harrity & Harrity, LLP

(57) ABSTRACT

A device may receive an input associated with deploying a virtual firewall on a computing device. The device may determine a first set of characteristics associated with the virtual firewall and a second set of characteristics associated with a hypervisor associated with the computing device. The device may automatically tune the virtual firewall based on the first set of characteristics and the second set of characteristics. The device may deploy the virtual firewall after tuning the virtual firewall.

20 Claims, 13 Drawing Sheets

Related U.S. Application Data continuation of application No. 16/883,652, filed on May 26, 2020, now Pat. No. 11,522,834.

(51) Int. Cl.
*H04L 41/08* (2022.01)
*H04L 41/0823* (2022.01)
*H04L 41/0895* (2022.01)

(52) U.S. Cl.
CPC ...... *H04L 41/0886* (2013.01); *H04L 41/0895* (2022.05); *G06F 2009/4557* (2013.01); *G06F 2009/45587* (2013.01); *G06F 2009/45595* (2013.01)

(56) References Cited

U.S. PATENT DOCUMENTS

| | | | |
|---|---|---|---|
| 9,264,402 | B2 | 2/2016 | Anderson |
| 9,444,723 | B1* | 9/2016 | Di Benedetto ....... H04L 69/321 |
| 9,459,904 | B2 | 10/2016 | Mehta et al. |
| 9,641,385 | B1* | 5/2017 | Daniel ................ H04L 41/0895 |
| 9,886,296 | B2 | 2/2018 | Clark et al. |
| 11,271,904 | B2 | 3/2022 | Kurkure et al. |
| 11,522,834 | B2 | 12/2022 | Alexis et al. |
| 2004/0249907 | A1 | 12/2004 | Brubacher et al. |
| 2010/0037289 | A1 | 2/2010 | Roy et al. |
| 2010/0211658 | A1 | 8/2010 | Hoogerwerf et al. |
| 2013/0019277 | A1 | 1/2013 | Chang et al. |
| 2013/0125230 | A1 | 5/2013 | Koponen et al. |
| 2014/0101656 | A1 | 4/2014 | Zhu et al. |
| 2014/0164619 | A1 | 6/2014 | Zhu et al. |
| 2014/0359749 | A1 | 12/2014 | Rieke et al. |
| 2015/0082417 | A1 | 3/2015 | Bhagwat et al. |
| 2015/0188775 | A1* | 7/2015 | Van Der Walt ..... H04L 41/0895 715/734 |
| 2015/0365349 | A1 | 12/2015 | Verma |
| 2016/0253192 | A1 | 9/2016 | Singaravelu et al. |
| 2017/0005986 | A1 | 1/2017 | Bansal et al. |
| 2017/0054686 | A1 | 2/2017 | Malkov et al. |
| 2018/0032361 | A1 | 2/2018 | Manickam et al. |
| 2019/0163538 | A1 | 5/2019 | Klein et al. |
| 2019/0273720 | A1 | 9/2019 | Cloud et al. |
| 2020/0119981 | A1 | 4/2020 | Guthrie et al. |
| 2020/0274852 | A1 | 8/2020 | Ahmed et al. |
| 2020/0310848 | A1 | 10/2020 | Kaul |
| 2023/0058466 | A1 | 2/2023 | Alexis et al. |

FOREIGN PATENT DOCUMENTS

| | | |
|---|---|---|
| CN | 109495422 A | 3/2019 |
| CN | 110291764 A | 9/2019 |

OTHER PUBLICATIONS

Extended European Search Report for Application No. EP20185025.2, mailed on Oct. 2, 2020, 12 pages.

Extended European Search Report for Application No. EP22206483.4, mailed on Jan. 11, 2023, 13 pages.

Juniper Networks, Inc., "vSRX Virtual Firewall," 8 pages, [retrieved on Feb. 11, 2020] Retrieved from the internet [URL: https://www.juniper.net/US/en/products-services/security/srx-series/vsrx].

Spinner S., et al., "Runtime Vertical Scaling of Virtualized Applications via Online Model Estimation," 2014 IEEE Eighth International Conference on Self-Adaptive and Self-Organizing Systems, 2014, pp. 157-166.

* cited by examiner

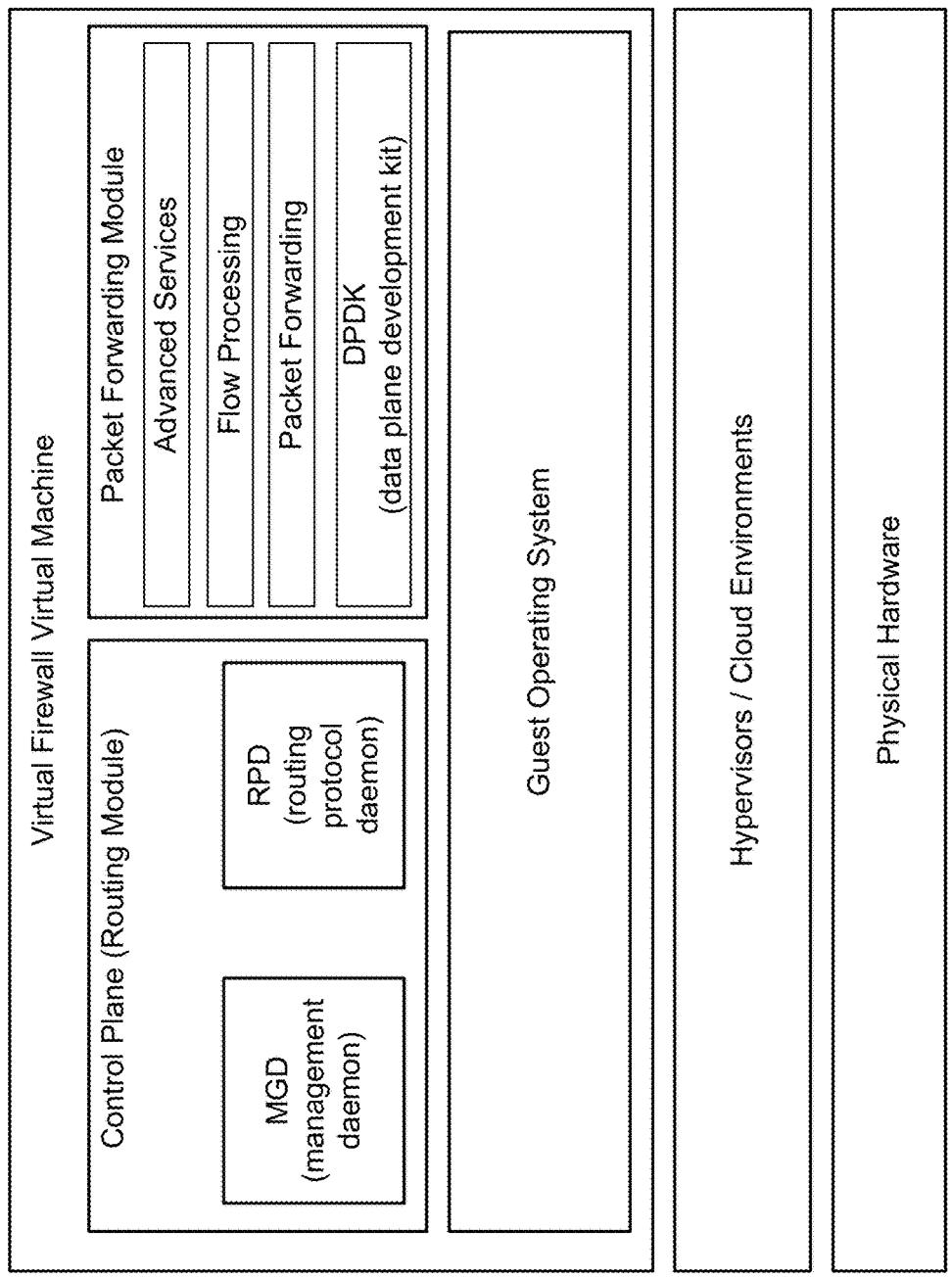
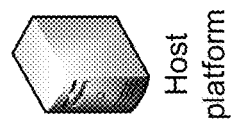
FIG. 1B

AUTOTUNING A VIRTUAL FIREWALL

CROSS-REFERENCE TO RELATED APPLICATIONS

This application is a continuation of U.S. patent application Ser. No. 18/046,232, filed Oct. 13, 2022, which is a continuation of U.S. patent application Ser. No. 16/883,652, filed May 26, 2020 (now U.S. Pat. No. 11,522,834), which claims priority to India Patent Application No. 202041015775, filed on Apr. 11, 2020, the contents of which are incorporated herein by reference in their entireties.

BACKGROUND

To protect a virtual machine, and a computer simulating the virtual machine, from unauthorized access and infection, a firewall may be implemented. The firewall checks incoming and/or outgoing packets of data against an existing list of characteristics that determine whether the packets should be allowed to continue to their destination or should be blocked. The firewall may be implemented on the computer simulating the virtual machine or the firewall may be a virtual firewall that is implemented on a virtual machine.

SUMMARY

According to some implementations, a method may include receiving, by a device, an input associated with deploying a virtual firewall on a computing device; determining, by a device, a first set of characteristics associated with the virtual firewall and a second set of characteristics associated with a hypervisor associated with the computing device; automatically tuning, by the device, the virtual firewall based on the first set of characteristics and the second set of characteristics; and deploying, by the device, the virtual firewall after tuning the virtual firewall.

According to some implementations, a device may include one or more memories and one or more processors. The one or more processors may be configured to: receive an input associated with deploying a virtual firewall; perform a process to tune the virtual firewall based on the input, configure a hypervisor associated with the virtual firewall based on one or more characteristics of the virtual firewall; and deploy the virtual firewall after tuning the virtual firewall.

According to some implementations, a non-transitory computer-readable medium may store one or more instructions. The one or more instructions, when executed by one or more processors of a device, may cause the one or more processors to: receive an input associated with deploying a virtual firewall; determine a type of the virtual firewall based on the input; determine a configuration setting associated with the virtual firewall based on the type of the virtual firewall; automatically tune the virtual firewall based on the configuration setting; and deploy the virtual firewall after tuning the virtual firewall.

BRIEF DESCRIPTION OF THE DRAWINGS

FIGS. 1A-1F are diagrams of one or more example implementations described herein.

DETAILED DESCRIPTION

Figure 1A:
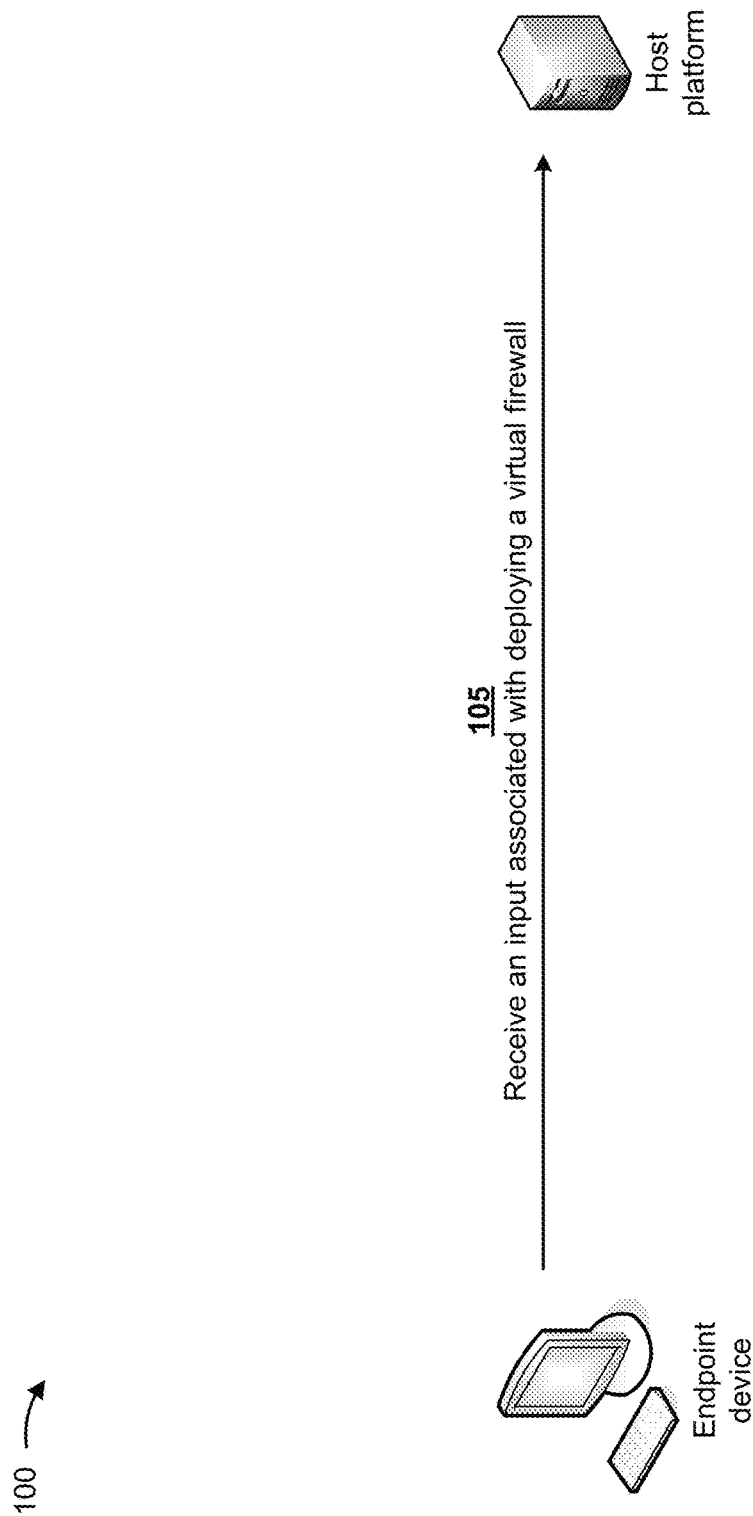

The following detailed description of example implementations refers to the accompanying drawings. The same reference numbers in different drawings may identify the same or similar elements.

A virtual machine is a simulated computer that is simulated by physical computer resources (e.g., of a physical machine). As virtual machines are intended to accurately simulate individual computers, the virtual machines often have the same security vulnerabilities as physical computers. For example, virtual machines can be infected with malware and can suffer from other unauthorized accesses.

To protect a virtual machine, and a computer simulating the virtual machine, from unauthorized access and infection, a firewall may be implemented. The firewall checks incoming and/or outgoing packets of data against an existing list of characteristics that determine whether the packets should be allowed to continue toward their destination or should be blocked. The firewall may be implemented on the computer simulating the virtual machine, may be implemented by a dedicated physical device, or may be a virtual firewall that is implemented on a virtual machine.

A virtual firewall may be deployed as an untuned virtual firewall or a tuned virtual firewall. An untuned virtual firewall is a virtual firewall that uses existing hypervisor and virtual machine settings. However, these existing settings may not provide for optimal performance of the virtual firewall thereby resulting in reduced performance and/or higher latency relative to a tuned virtual firewall.

A tuned virtual firewall is a virtual firewall that modifies existing hypervisor and virtual machine settings to optimize performance of the virtual firewall. However, tuning a virtual firewall is a complicated process that requires a user to determine characteristics of the virtual firewall, characteristics of the computing device on which the virtual firewall is to be implemented, characteristics of the hypervisor, and/or the like, to determine how the hypervisor and virtual machine settings are to be modified based on the determined characteristics, and to then modify the hypervisor and virtual machine settings. Because tuning a virtual firewall is a complicated process, a user may improperly, and/or fail to, modify one or more of the existing hypervisor and virtual machine settings thereby resulting in reduced performance and/or higher latency relative to a properly tuned virtual firewall and/or an untuned virtual firewall. This may also lead to consumption of computing resources to troubleshoot an improperly tuned virtual firewall in an attempt to improve performance.

According to some implementations described herein, a host platform automatically tunes a virtual firewall. In some implementations, the host platform may receive an input associated with deploying a virtual firewall on a computing device. The host platform may determine a first set of characteristics associated with the virtual firewall and a second set of characteristics associated with a hypervisor associated with the computing device. The host platform may automatically tune the virtual firewall based on the first set of characteristics and the second set of characteristics.

After tuning the virtual firewall, the host platform may deploy the virtual firewall on the computing device. In this way, the host platform optimizes a performance and/or a latency of the virtual firewall by automatically tuning the virtual firewall prior to the virtual firewall being deployed. Also, by automatically tuning the virtual firewall, the host platform may conserve computing resources that would have otherwise been used to troubleshoot an improperly tuned virtual firewall in an attempt to improve performance.

FIGS. 1A-1F are diagrams of one or more example implementations 100 described herein. As shown in FIGS. 1A-1F, a user may use an endpoint device (e.g., a laptop computer, a tablet computer, a handheld computer, a desktop computer, a mobile phone (e.g., a smart phone, a radiotelephone, etc.), a personal digital assistant, a network device (e.g., a router, a gateway, a firewall, a hub, a bridge, etc.), a telephone, and/or the like) to access a cloud computing service to cause a host platform (e.g., a server device, a collection of server devices, and/or the like) to automatically tune and/or deploy a virtual firewall.

As shown in FIG. 1A, and by reference number 105, the host platform receives an input associated with deploying a virtual firewall. For example, a user may log in to a portal associated with a cloud computing service provided by a host platform to access a user interface for deploying a virtual firewall. The user interface may allow the user to input information indicating that the host platform is to implement a virtual firewall on a computing device.

In some implementations, the input includes information indicating that the host platform is to automatically tune the virtual firewall prior to the virtual firewall being deployed. For example, the user interface may include a knob, a drop-down menu, a selectable icon, and/or the like that enables the user to input information indicating that the host platform is to automatically tune the virtual firewall. The host platform may automatically tune the virtual firewall prior to the virtual firewall being deployed based on the information input by the user. In some implementations, the host platform may deploy an untuned firewall and may automatically tune the deployed firewall, as described below in connection with FIG. 1E.

In some implementations, the host platform determines a computing device on which the virtual firewall is to be deployed. As shown in FIG. 1B, the computing device includes a hardware layer, a hypervisor layer, a virtual machine layer, and/or the like. The hardware layer includes the physical hardware of the computing device such as physical network interface cards (NICs), central processing units (CPUs), memory, and/or the like.

The hypervisor layer is provided on top of the physical layer and includes one or more hypervisors. A hypervisor manages and controls the physical resources of the computing device and creates and manages a guest virtual machine (e.g., a virtual firewall) implemented on the computing device. The hypervisor may be a Type 1 hypervisor that runs directly on the physical hardware of the computing device with no host operating system or a Type 2 hypervisor that runs on top of a host operating system.

The virtual machine layer implements the virtual firewall. The virtual machine layer includes a guest operating system that may implement a routing module and a packet forwarding module. The routing module may include a management daemon (MGD) and a routing protocol daemon (RPD). The MGD may enable communication between processes associated with the virtual firewall, may provide an interface to a configuration database, and/or the like. The RPD may define how routing protocols select routes, maintain a forwarding table, and/or the like. The packet forwarding module may perform one or more security functions of the virtual machine. For example, the packet forwarding module may apply filters, routing policies, and/or other security features to data packets received by the virtual firewall.

As shown in FIG. 1B, the packet forwarding module includes an advanced services module, a flow processing module, a packet forwarding module, and a data plane development kit (DPDK) module. The advanced services module may include one or more security features relating to data packets received by the virtual firewall and/or connections established through the virtual firewall. For example, the advanced services module may apply an inbound rule to an incoming data packet (e.g. block all incoming data packets associated with a particular IP address), may apply an outbound rule to an outbound data packet (e.g., allow all outbound traffic associated with a particular device), and/or may apply a connection security rule (e.g., to require two peer computing devices to authenticate before establishing a connection).

The flow processing module may control a flow of data packets through the virtual firewall. For example, the flow processing module may apply one or more filters to the input and/or the output of a virtual network interface to control the flow of data packets through the virtual firewall.

The packet forwarding module may control the forwarding of data packets to a destination device. For example, the packet forwarding module may apply one or more routing policies to the input and/or the output of a virtual network interface to forward data packets processed by the virtual firewall toward a destination device.

The DPDK module may perform one or more functions associated with data packet processing. For example, the DPDK module may include a set of data plane libraries and network interface controller drivers that may be used to accelerate packet processing workloads of the virtual firewall by implementing a lockless queue, pre-allocating fixed sized buffers, and/or the like.

Figure 1C:
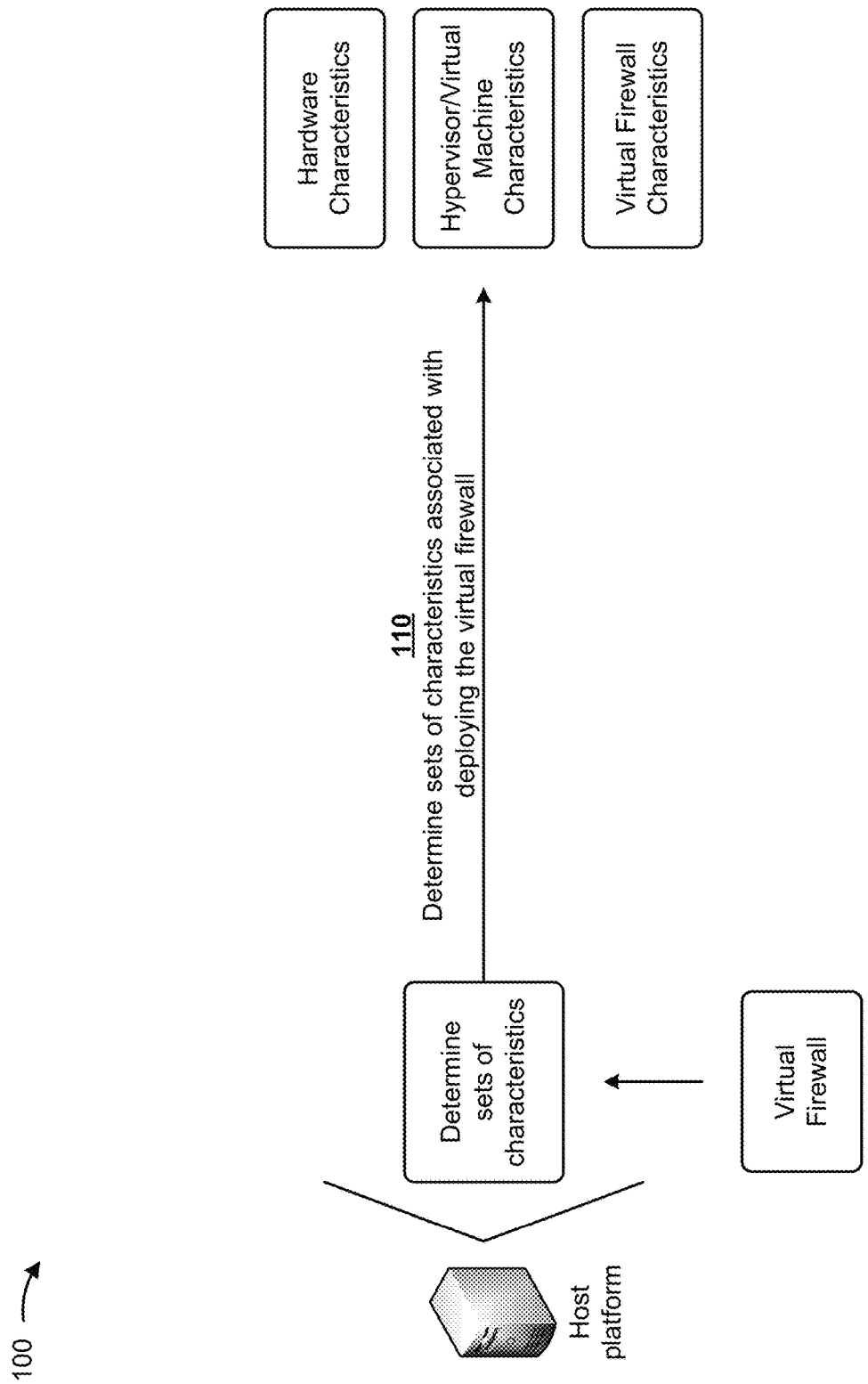

As shown in FIG. 1C, and by reference number 110, the host platform determines a set of characteristics associated with deploying the virtual firewall on the computing device. In some implementations, the host platform determines the set of characteristics based on information stored in a data structure in a memory associated with the host platform, information input by a user, information obtained from a device associated with a third party (e.g., a manufacturer associated with the physical hardware of the computing device, a manufacturer associated with the computing device, a manufacturer associated with the hypervisor, a manufacturer associated with the virtual firewall, and/or the like), and/or the like. As shown in FIG. 1C, the characteristics include hardware characteristics, hypervisor/virtual machine characteristics, virtual firewall characteristics, and/or the like.

The hardware characteristics may include one or more characteristics, properties, attributes, and/or the like associated with the hardware layer of the computing device. For example, the hardware characteristics may indicate a type of the computing device (e.g., a server device, an x86 server, a Linux server, and/or the like), a type of the CPU (e.g., an x86 32-bit CPU, an x86 64-bit CPU, and/or the like), a number of cores associated with the CPU (e.g., 1 core, 2 cores, 4 cores, and/or the like), a processor speed (e.g., a number of cycles per second at which the CPU operates and is able to process information) associated with the CPU (e.g., 1.8 GHz, 2.3 GHz, 2.8 GHz, and/or the like), an amount of random access memory (RAM) available to the CPU, an amount of available memory, whether the physical hardware (e.g., NIC) is able to support single-root input/output virtualization (SR-IOV) and/or multiple-root input/output virtualization (MR-IOV), a type and/or version of host operating system running on the computing device, and/or the like. The above-listed hardware characteristics are intended to be merely examples of types of hardware characteristics that may be used. In practice, the hardware characteristics may include any one or more of the above-listed hardware characteristics and/or one or more other types of hardware characteristics not listed above.

The hypervisor/virtual machine characteristics may include one or more characteristics, properties, attributes, settings, and/or the like associated with the hypervisor running on the computing device and/or deployment of the virtual firewall. For example, the hypervisor/virtual machine characteristics may indicate a type of the hypervisor (e.g., Type 1, Type 2, VMware, Hyper-V, vSphere, and/or the like), a number of SCSI controllers to be associated with the virtual firewall, a boot order associated with the virtual firewall (e.g., an order in which boot devices (e.g., hardware interface, network adapter, hard drive, and/or the like) are checked to start the guest operating system), whether a secure boot feature is enabled, a total amount of memory to be made available to the virtual firewall, whether a dynamic memory feature will be enabled, a minimum amount of RAM memory to be made available to the virtual firewall, a maximum amount of RAM memory to be made available to the virtual firewall, a size of a memory buffer associated with an increase in dynamic memory allocation, a memory assignment priority to be assigned to the virtual firewall, a quantity of virtual CPUs associated with the virtual firewall, a minimum amount of physical CPUs that will be available to the virtual firewall, a quantity of non-uniform memory access (NUMA) nodes that will be associated with the virtual firewall, a quantity of sockets that will be associated with the virtual firewall, a NUMA topology to be associated with the virtual firewall, a maximum number of virtual CPUs that can be associated with a NUMA node, a maximum size of a NUMA node, whether IP forwarding is enabled/disabled, whether an Irqbalance is enabled/disabled (e.g., a process that balances the CPU load generated by interrupts across a set of CPUs), whether a security module associated with the hypervisor is enabled/disabled, whether a process for randomizing address space is enabled/disabled, and/or the like. The above-listed hypervisor/virtual machine characteristics are intended to be merely examples of types of hypervisor/virtual machine characteristics that may be used. In practice, the hypervisor/virtual machine characteristics may include any one or more of the above-listed hypervisor/virtual machine characteristics and/or one or more other types of hypervisor/virtual machine characteristics not listed above.

The virtual firewall characteristics may include one or more characteristics, properties, attributes, and/or the like associated with implementing a virtual firewall on the computing device. For example, the virtual firewall characteristics may indicate a manufacturer associated with the virtual firewall, a brand associated with the virtual firewall, a software version associated with the virtual firewall, a quantity of interfaces supported by the virtual firewall, a volume of traffic that the virtual firewall is capable of supporting, a maximum quantity of filters that the virtual firewall is capable of supporting, a rate at which the virtual firewall is capable of processing traffic, and/or the like. The above-listed virtual firewall characteristics are intended to be merely examples of types of virtual firewall characteristics that may be used. In practice, the virtual firewall characteristics may include any one or more of the above-listed virtual firewall characteristics and/or one or more other types of virtual firewall characteristics not listed above.

Figure 1D:
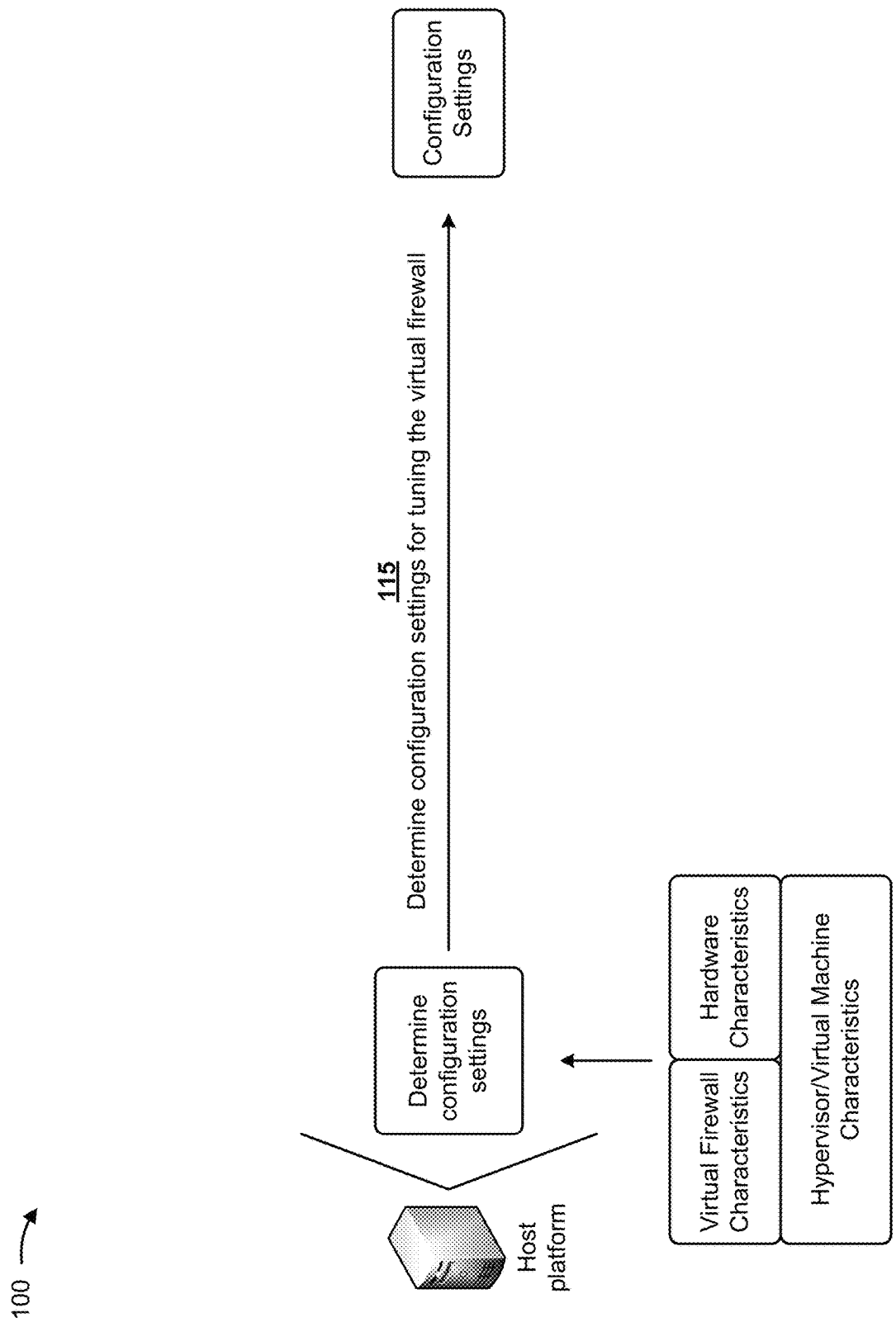

As shown in FIG. 1D, and by reference number 115, the host platform may determine configuration settings for tuning the virtual firewall. For example, the host platform may determine a set of configuration settings associated with increasing a performance of the virtual firewall and/or decreasing a latency associated with the virtual firewall relative to a virtual firewall deployed based on a current, or default, set of configuration settings associated with the hypervisor layer and/or the virtual machine layer of the computing device.

In some implementations, the host platform determines the configuration settings based on information stored in a data structure. The data structure may include a plurality of entries. An entry, in the data structure, may be associated with a particular type of virtual firewall, a particular type of computing device, and/or a particular type of hypervisor. The host platform may determine a type of the virtual firewall based on the virtual firewall characteristics. The host platform may determine a type of the computing device based on the hardware characteristics. The host platform may determine a type of the hypervisor based on the hypervisor/virtual machine characteristics. The host platform may identify an entry in the data structure associated with the type of virtual firewall, the type of computing device, and the type of hypervisor. The entry may include information identifying configuration settings for automatically tuning the virtual firewall.

In some implementations, the entry may include a plurality of sets of configuration settings. Each set of configuration settings may be associated with an additional virtual firewall characteristic, an additional hardware characteristic, and/or an additional hypervisor/virtual machine characteristic. For example, a set of configuration settings may be associated with the type of virtual firewall, the type of computing device having a CPU having a particular quantity of cores, and the type of hypervisor. Another set of configuration settings may be associated with the type of virtual firewall, the type of computing device, the type of hypervisor, and a particular version of software associated with the virtual firewall and/or the hypervisor.

In some implementations, the host platform may use a machine learning model to determine the configuration settings, as described in more detail below. For example, the host platform may train the machine learning model based on one or more parameters associated with tuning a virtual firewall, such as one or more hardware characteristics, one or more hypervisor/virtual machine characteristics, one or more virtual firewall characteristics, and/or the like. The host platform may train the machine learning model, according to the one or more parameters, using historical data associated with determining the configuration settings. Using the one or more parameters as inputs to the machine learning model, the host platform may determine the configuration settings to be used to automatically tune the virtual firewall.

Figure 1E:
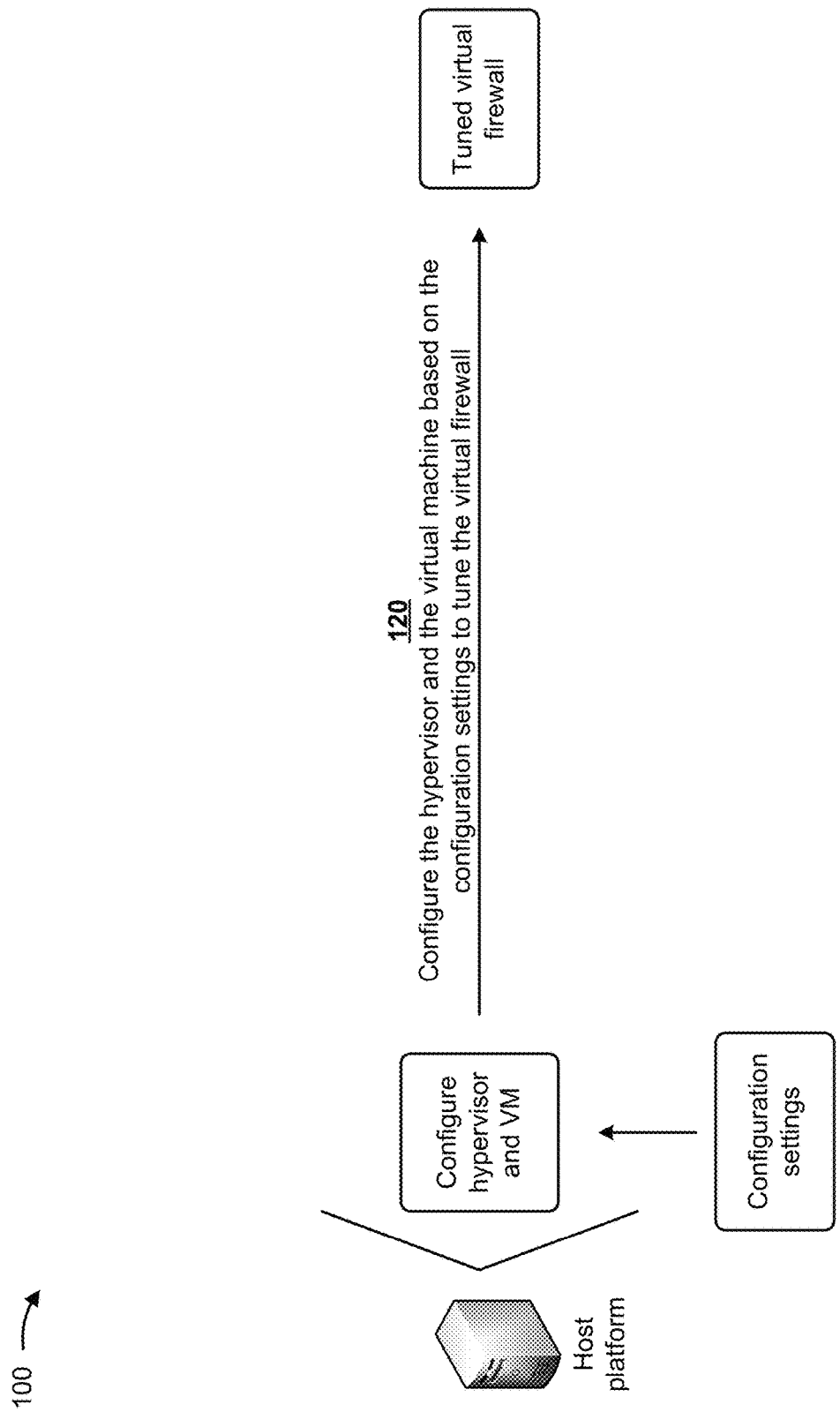

As shown in FIG. 1E, and by reference number 120, the host platform may tune the virtual firewall by configuring the hypervisor and/or the virtual machine based on the configuration settings. For example, the hypervisor may have a quantity of virtual CPUs setting set to a default value. The host platform may modify the quantity of virtual CPUs setting to change the quantity of virtual CPUs setting from the default value to a value indicated by the configuration settings.

In some implementations, the host platform may tune the virtual firewall based on a priority associated with the virtual firewall. For example, the user may input information, via the user interface, indicating that the virtual firewall is associated with a high priority relative to other virtual firewalls associated with the host platform. The host platform may tune the virtual firewall based on the virtual firewall being associated with the high priority.

In some implementations, a high priority may be a default priority associated with the virtual firewall. For example, the host platform may associate each virtual firewall to be deployed by the host platform with a high priority unless a user provides an input (e.g., via the user interface) indicating that the virtual firewall is to be associated with a low priority.

In some implementations, the host platform may prevent the virtual firewall from being tuned when the virtual firewall is associated with the low priority. For example, the virtual firewall may be one of a plurality of virtual firewalls being deployed by the host platform. The user may provide information identifying a particular virtual firewall as being associated with a high priority relative to the other virtual firewalls and/or may provide information identifying the other virtual firewalls as being associated with a low priority relative to the particular virtual firewall. The host platform may automatically tune the particular virtual firewall based on the particular virtual firewall being associated with the high priority. The host platform may not tune the other virtual firewalls and/or may deploy the other virtual firewalls based on the configuration settings determined for the particular virtual firewall based on the other virtual firewalls being associated with the low priority.

In some implementations, the host platform may determine that the virtual firewall cannot be tuned. For example, the host platform may determine that the user is not associated with a privilege that allows for the modification of the hypervisor settings and/or the virtual machine settings, that the host platform is unable to access a particular hardware component, and/or the like. The host platform may provide information identifying an issue preventing the host platform from tuning the virtual firewall, information identifying a corrective action to be taken by the user or the host platform to enable the host platform to tune the virtual firewall, and/or the like.

In some implementations, the host platform may deploy the virtual firewall as an untuned firewall based on the host platform determining that the virtual firewall cannot be tuned. In some implementations, the host platform may determine that the user or the host platform has performed the corrective action and tune the virtual firewall, either prior to deploying the virtual firewall or after deploying the virtual firewall, based on the user or the host platform performing the corrective action.

In some implementations, the host platform may perform a resource availability check after tuning the virtual firewall and/or after determining that the virtual firewall cannot be tuned. The resource availability check may be performed to determine that the computing device on which the virtual firewall is to be implemented satisfies certain minimum requirements for implementing the virtual firewall. For example, the resource availability check may determine whether NUMA socket/hyper-threading is enabled/disabled, whether the virtual firewall is to be implemented on a NUMA associated with a NIC port, and/or the like. If the resource availability check is not successfully performed (e.g., the host platform determines that the computing device does not satisfy the minimum requirements), the host platform may determine to deploy the virtual firewall on a different computing device, output information indicating that the computing device does not satisfy the minimum requirements, prevent the virtual firewall from being deployed on the computing device, and/or the like.

Figure 1F:
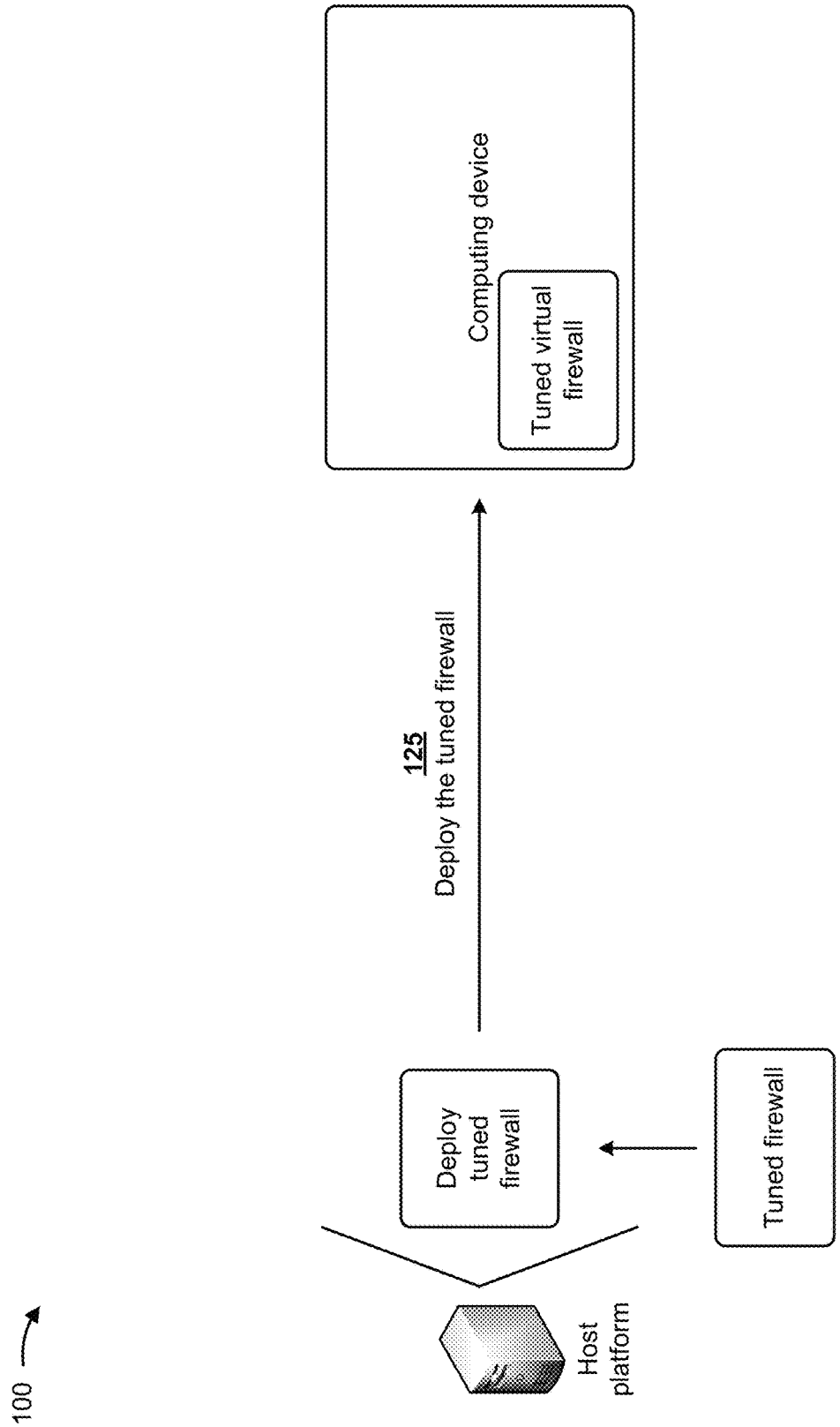

As shown in FIG. 1F, and by reference number 125, the host platform may deploy the tuned virtual firewall on the computing device. In some implementations, the host platform may deploy the tuned virtual firewall based on successfully performing the resource availability check. The computing device may implement the virtual firewall based on the configured hypervisor and/or virtual machine. In this way, the host platform optimizes a performance and/or a latency of the virtual firewall by automatically tuning the virtual firewall prior to the virtual firewall being deployed. Further, by automatically tuning the virtual firewall, the host device may prevent the virtual firewall from having a reduced performance and/or increased latency relative to a tuned firewall as a result of a user improperly, and/or failing to, modify one or more of the existing hypervisor and/or virtual machine settings.

As indicated above, FIGS. 1A-1F are provided merely as one or more examples. Other examples may differ from what is described with regard to FIGS. 1A-1F.

Figure 2:
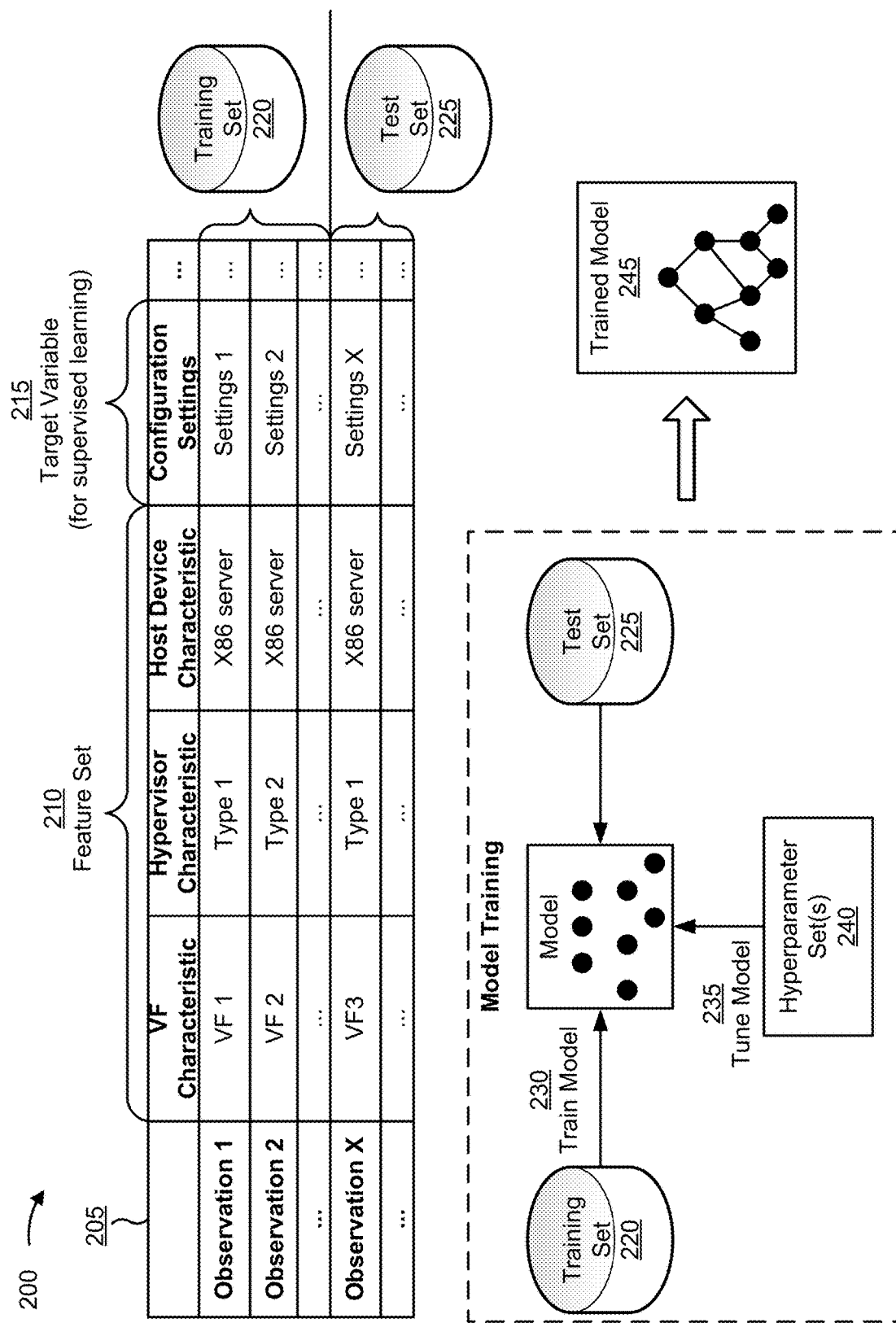
FIG. 2 is a diagram illustrating an example of training a machine learning model.

FIG. 2 is a diagram illustrating an example 200 of training a machine learning model. The machine learning model training described herein may be performed using a machine learning system. The machine learning system may include a computing device, a server, a cloud computing environment, and/or the like, such as the host platform.

As shown by reference number 205, a machine learning model may be trained using a set of observations. The set of observations may be obtained and/or input from historical data, such as data gathered during one or more processes described herein. For example, the set of observations may include data gathered from user interaction with and/or user input to the host platform and/or the endpoint device, as described elsewhere herein. In some implementations, the machine learning system may receive the set of observations (e.g., as input) from the host platform.

As shown by reference number 210, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from the host platform. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from the host platform and/or the endpoint device, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of a virtual firewall (VF) characteristic, a second feature of a hypervisor characteristic, a third feature of a host device (e.g., the computing device that the virtual firewall is to be implemented on) characteristic, and so on. As shown, for a first observation, the first feature may have a value of VF1 (e.g., a first type, brand, version, and/or the like of virtual firewall), the second feature may have a value of Type 1, the third feature may have a value of x86 server, and so on. These features and feature values are provided as examples, and may differ in practice. For example, the feature set may include one or more of the following features: a particular virtual machine characteristic, a particular virtual firewall characteristic, a particular hypervisor characteristic, a particular host device characteristic, and/or the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 215, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit, tune, and/or the like) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used, based on randomly generating hyperparameter values, and/or the like). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k–1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, closest to a desired threshold, and/or the like) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 3:
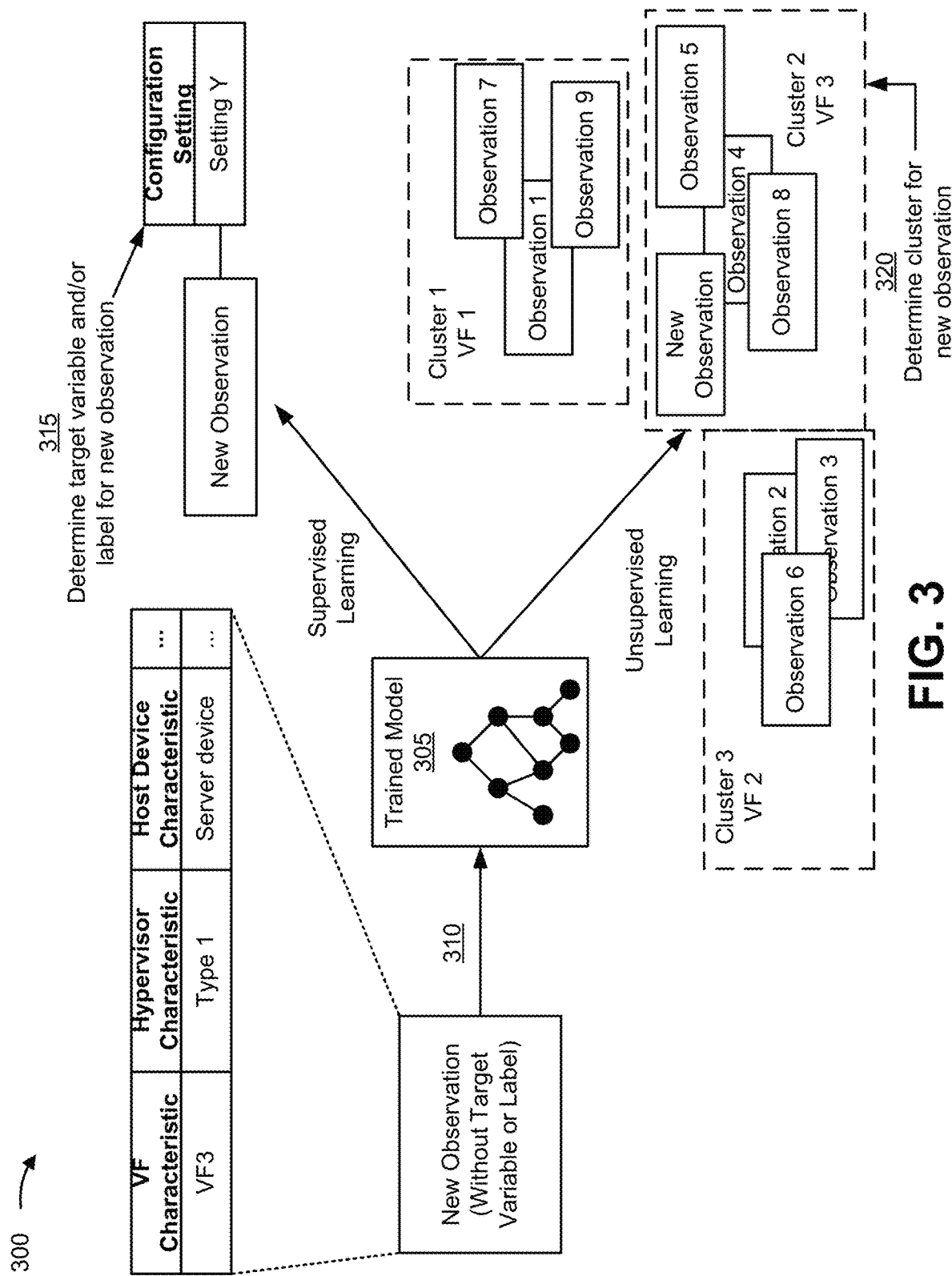
FIG. 3 is a diagram illustrating an example of applying a trained machine learning model to a new observation.

FIG. 3 is a diagram illustrating an example 300 of applying a trained machine learning model to a new observation. The new observation may be input to a machine learning system that stores a trained machine learning model 305. In some implementations, the trained machine learning model 305 may be the trained machine learning model 245 described above in connection with FIG. 2. The machine learning system may include a computing device, a server, a cloud computing environment, and/or the like, such as the host platform.

As shown by reference number 310, the machine learning system may receive a new observation (or a set of new observations), and may input the new observation to the machine learning model 305. As shown, the new observation may include a first feature of a virtual firewall (VF) characteristic, a second feature of a hypervisor characteristic, a third feature of a host device characteristic, and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 305 may predict a set of configuration settings (shown as Setting Y) for the target variable of Configuration Setting for the new observation, as shown by reference number 315. Based on this prediction, the machine learning system may perform an automated action and/or may cause an automated action to be performed (e.g., by instructing another device to perform the automated action), such as tuning a virtual firewall associated with the new observation based on the configuration settings determined for the new observation.

In some implementations, the trained machine learning model 305 may classify (e.g., cluster) the new observation in a cluster associated with a type of virtual firewall, as shown by reference number 320. The observations within a cluster may have a threshold degree of similarity. Based on classifying the new observation in the cluster, the machine learning system may provide a recommendation, such as recommending the configuration settings to be used to tune the virtual firewall and/or the like. Additionally, or alternatively, the machine learning system may perform an automated action and/or may cause an automated action to be performed (e.g., by instructing another device to perform the automated action), such as deploying the virtual firewall on to a particular host device.

In this way, the machine learning system may apply a rigorous and automated process to determine configuration settings for tuning a virtual firewall. The machine learning system enables recognition and/or identification of tens, hundreds, thousands, or millions of features and/or feature values for tens, hundreds, thousands, or millions of observations, thereby increasing an accuracy and consistency of tuning a virtual firewall relative to requiring computing resources to be allocated for operators to manually determine configuration settings for tuning a virtual firewall using the features or feature values.

As indicated above, FIG. 3 is provided as an example. Other examples may differ from what is described in connection with FIG. 3.

Figure 4:
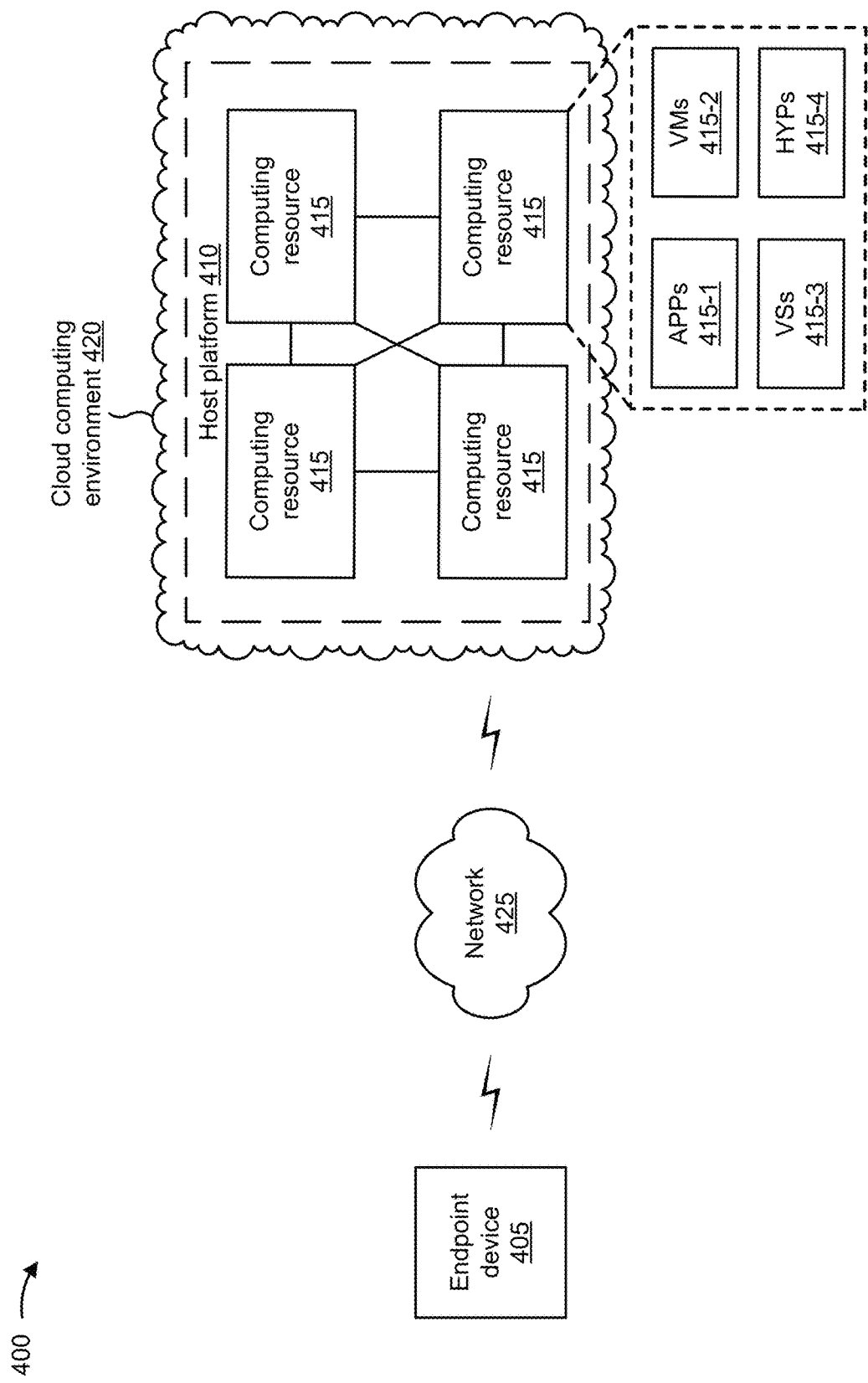
FIG. 4 is a diagram of an example environment in which systems and/or methods described herein may be implemented.

FIG. 4 is a diagram is a diagram of an example environment 400 in which systems and/or methods described herein may be implemented. As shown in FIG. 4, environment 400 may include an endpoint device 405, a host platform 410 implemented within cloud computing environment 420, and a network 425. Devices of environment 400 may interconnect via wired connections, wireless connections, or a combination of wired and wireless connections.

Endpoint device 405 includes one or more devices capable of receiving and/or providing information over a network (e.g., network 425), and/or capable of generating, storing, and/or processing information received and/or provided over the network. For example, endpoint device 405 may include a computing device, such as a laptop computer, a tablet computer, a handheld computer, a desktop computer, a mobile phone (e.g., a smart phone, a radiotelephone, etc.), a personal digital assistant, a network device (e.g., a router, a gateway, a firewall, a hub, a bridge, etc.), a telephone, or a similar device Host platform 410 includes one or more computing resources assigned to support and/or automatically tune a virtual firewall. For example, host platform 410 may be a platform implemented by cloud computing environment 420 that may automatically tune a virtual firewall. In some implementations, host platform 410 is implemented by computing resources 415 of cloud computing environment 420.

Host platform 410 may include a server device or a group of server devices. In some implementations, host platform 410 may be hosted in cloud computing environment 420. Notably, while implementations described herein may describe host platform 410 as being hosted in cloud computing environment 420, in some implementations, host platform 410 may be non-cloud-based or may be partially cloud-based.

Cloud computing environment 420 includes an environment that delivers computing as a service, whereby shared resources, services, and/or the like may be provided to host platform 410 and/or endpoint device 405. Cloud computing environment 420 may provide computation, software, data access, storage, and/or other services that do not require end-user knowledge of a physical location and configuration of a system and/or a device that delivers the services. As shown, cloud computing environment 420 may include host platform 410 and computing resource 415.

Computing resource 415 includes one or more personal computers, workstation computers, server devices, or another type of computation and/or communication device. In some implementations, computing resource 415 may host host platform 410. The cloud resources may include compute instances executing in computing resource 415, storage devices provided in computing resource 415, data transfer devices provided by computing resource 415, and/or the like. In some implementations, computing resource 415 may communicate with other computing resources 415 via wired connections, wireless connections, or a combination of wired and wireless connections.

As further shown in FIG. 4, computing resource 415 may include a group of cloud resources, such as one or more applications ("APPs") 415-1, one or more virtual machines ("VMs") 415-2, virtualized storage ("VSs") 415-3, one or more hypervisors ("HYPs") 415-4, or the like.

Application 415-1 includes one or more software applications that may be provided to or accessed by endpoint device 405. Application 415-1 may eliminate a need to install and execute the software applications on endpoint device 405. For example, application 415-1 may include software associated with host platform 410 and/or any other software capable of being provided via cloud computing environment 420. In some implementations, one application 415-1 may send/receive information to/from one or more other applications 415-1, via virtual machine 415-2.

Virtual machine 415-2 includes a software implementation of a machine (e.g., a computer) that executes programs like a physical machine. Virtual machine 415-2 may be either a system virtual machine or a process virtual machine, depending upon use and degree of correspondence to any real machine by virtual machine 415-2. A system virtual machine may provide a complete system platform that supports execution of a complete operating system ("OS"). A process virtual machine may execute a single program and may support a single process. In some implementations, virtual machine 415-2 may execute on behalf of a user (e.g., endpoint device 405), and may manage infrastructure of cloud computing environment 420, such as data management, synchronization, or long-duration data transfers.

Virtualized storage 415-3 includes one or more storage systems and/or one or more devices that use virtualization techniques within the storage systems or devices of computing resource 415. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 415-4 provides hardware virtualization techniques that allow multiple operating systems (e.g., "guest operating systems") to execute concurrently on a host computer, such as computing resource 415. Hypervisor 415-4 may present a virtual operating platform to the "guest operating systems" and may manage the execution of the guest operating systems. Multiple instances of a variety of operating systems may share virtualized hardware resources.

Network 425 includes one or more wired and/or wireless networks. For example, network 425 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 4 are provided as one or more examples. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
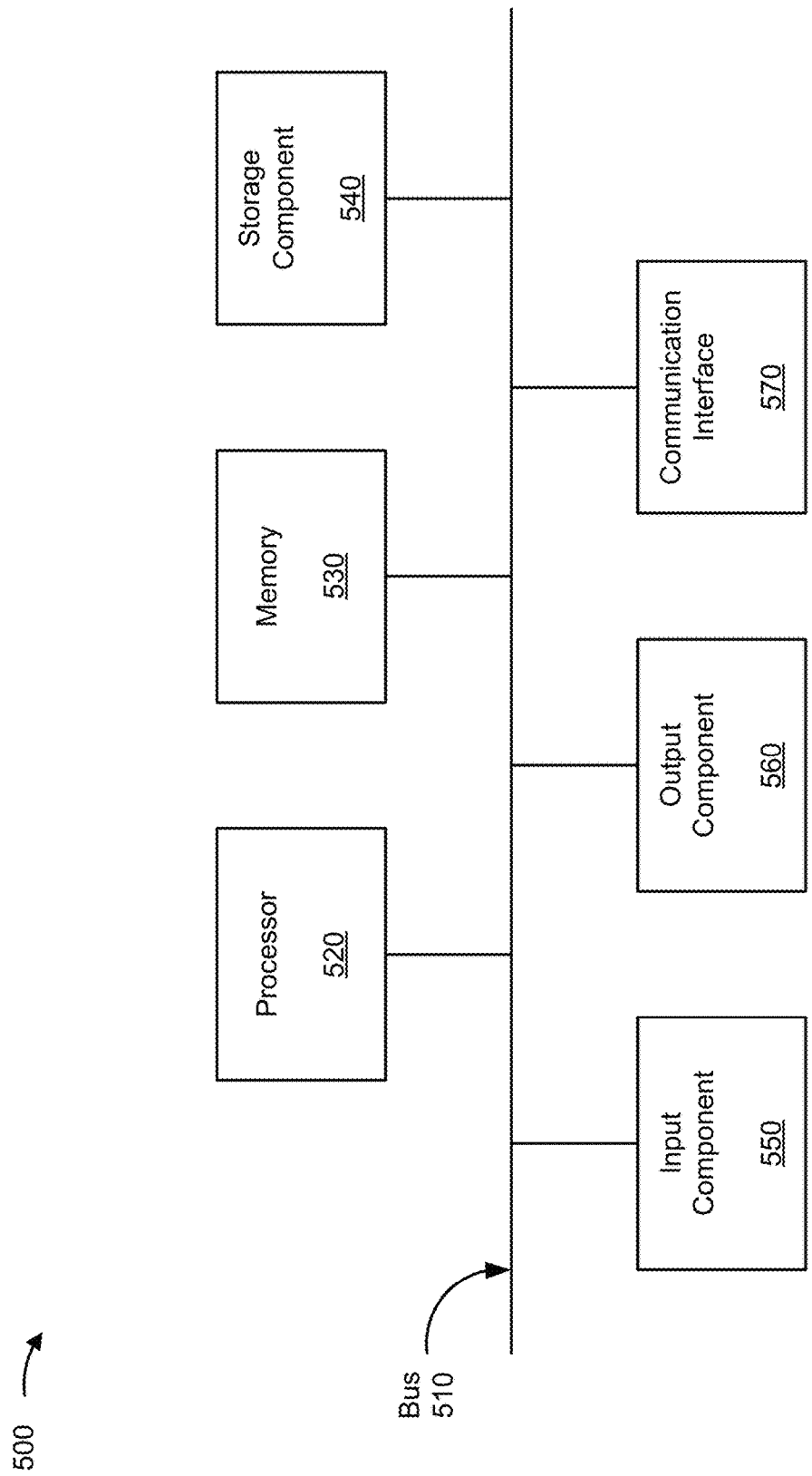
FIG. 5 is a diagram of example components of one or more devices of FIG. 4.

FIG. 5 is a diagram of example components of a device 500. Device 500 may correspond to endpoint device 405, host platform 410, and/or computing resource 415. In some implementations, endpoint device 405, host platform 410, and/or computing resource 415 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among multiple components of device 500. Processor 520 is implemented in hardware, firmware, and/or a combination of hardware and software. Processor 520 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a component for determining location (e.g., a global positioning system (GPS) component) and/or a sensor (e.g., an accelerometer, a gyroscope, an actuator, another type of positional or environmental sensor, and/or the like). Output component 560 includes a component that provides output information from device 500 (via, e.g., a display, a speaker, a haptic feedback component, an audio or visual indicator, and/or the like).

Communication interface 570 includes a transceiver-like component (e.g., a transceiver, a separate receiver, a separate transmitter, and/or the like) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. As used herein, the term "computer-readable medium" refers to a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
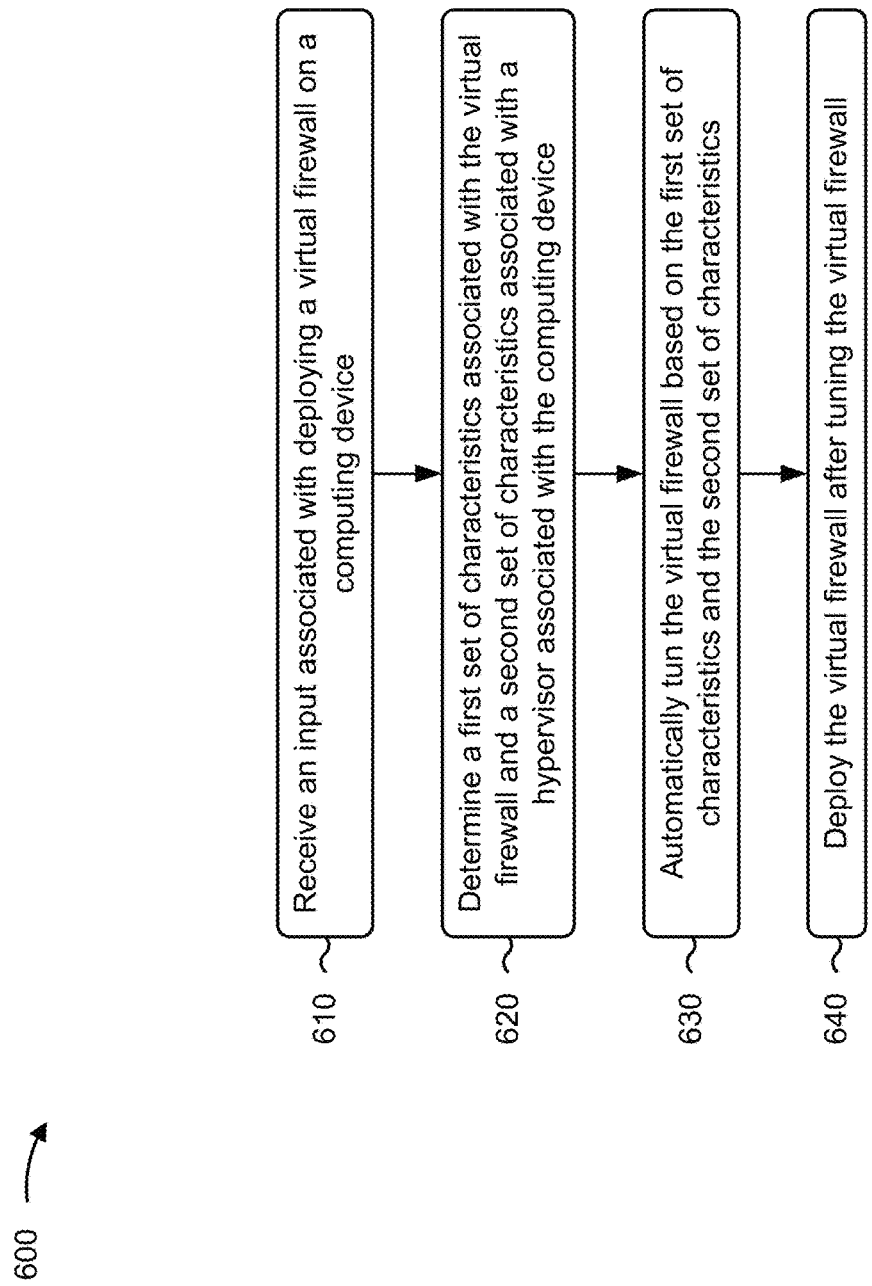
FIGS. 6-8 are flowcharts of an example process for autotuning a virtual firewall.

FIG. 6 is a flow chart of an example process 600 for automatically tuning a virtual firewall. In some implementations, one or more process blocks of FIG. 6 may be performed by a device (e.g., host platform 410). In some implementations, one or more process blocks of FIG. 6 may be performed by another device or a group of devices separate from or including the device, such as an endpoint device (e.g., endpoint device 405), and/or the like.

As shown in FIG. 6, process 600 may include receiving an input associated with deploying a virtual firewall on a computing device (block 610). For example, the device (e.g., using computing resource 415, processor 520, memory 530, storage component 540, input component 550, output component 560, communication interface 570, and/or the like) may receive an input associated with deploying a virtual firewall on a computing device, as described above.

As further shown in FIG. 6, process 600 may include determining a first set of characteristics associated with the virtual firewall and a second set of characteristics associated with a hypervisor associated with the computing device (block 620). For example, the device (e.g., using computing resource 415, processor 520, memory 530, storage component 540, input component 550, output component 560, communication interface 570, and/or the like) may determine a first set of characteristics associated with the virtual firewall and a second set of characteristics associated with a hypervisor associated with the computing device, as described above.

As further shown in FIG. 6, process 600 may include automatically tuning the virtual firewall based on the first set of characteristics and the second set of characteristics (block 630). For example, the device (e.g., using computing resource 415, processor 520, memory 530, storage component 540, input component 550, output component 560, communication interface 570, and/or the like) may automatically tun, by the device, the virtual firewall based on the first set of characteristics and the second set of characteristics, as described above.

As further shown in FIG. 6, process 600 may include deploying the virtual firewall after tuning the virtual firewall (block 640). For example, the device (e.g., using computing resource 415, processor 520, memory 530, storage component 540, input component 550, output component 560, communication interface 570, and/or the like) may deploy the virtual firewall after tuning the virtual firewall, as described above.

Process 600 may include additional implementations, such as any single implementation or any combination of implementations described below and/or in connection with one or more other processes described elsewhere herein.

In a first implementation, automatically tuning the virtual firewall comprises: modifying a hypervisor setting based on the first set of characteristics and the second set of characteristics.

In a second implementation, alone or in combination with the first implementation, automatically tuning the virtual firewall comprises: modifying a virtual machine setting based on the first set of characteristics and the second set of characteristics.

In a third implementation, alone or in combination with one or more of the first and second implementations, the virtual firewall is a first virtual firewall, the method further comprising: determining to deploy a second virtual firewall; determining that a priority associated with the first virtual firewall is a higher priority relative to a priority associated with the second virtual firewall, and deploying the second virtual firewall based on the first set of characteristics and the second set of characteristics based on the priority associated with the first virtual firewall being the higher priority.

In a fourth implementation, alone or in combination with one or more of the first through third implementations, receiving the input comprises: receiving, via the user interface, an input indicating that the device is to automatically tune the virtual firewall.

In a fifth implementation, alone or in combination with one or more of the first through fourth implementations, process 600 includes performing a resource availability check to determine whether the virtual firewall is able to be deployed on the computing device, wherein the virtual firewall is being deployed based on determining whether the virtual firewall is able to be deployed on the computing device.

In a sixth implementation, alone or in combination with one or more of the first through fifth implementations, the device determines that the virtual firewall is not able to be deployed on the computing device, the method further comprises: providing information identifying a group of settings, associated with the computing device, to be modified to enable the virtual firewall to be deployed on the computing device; determining that the group of settings have been modified, and deploying the virtual firewall based on the modified group of settings, the virtual firewall is deployed based on performing the resource availability check.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
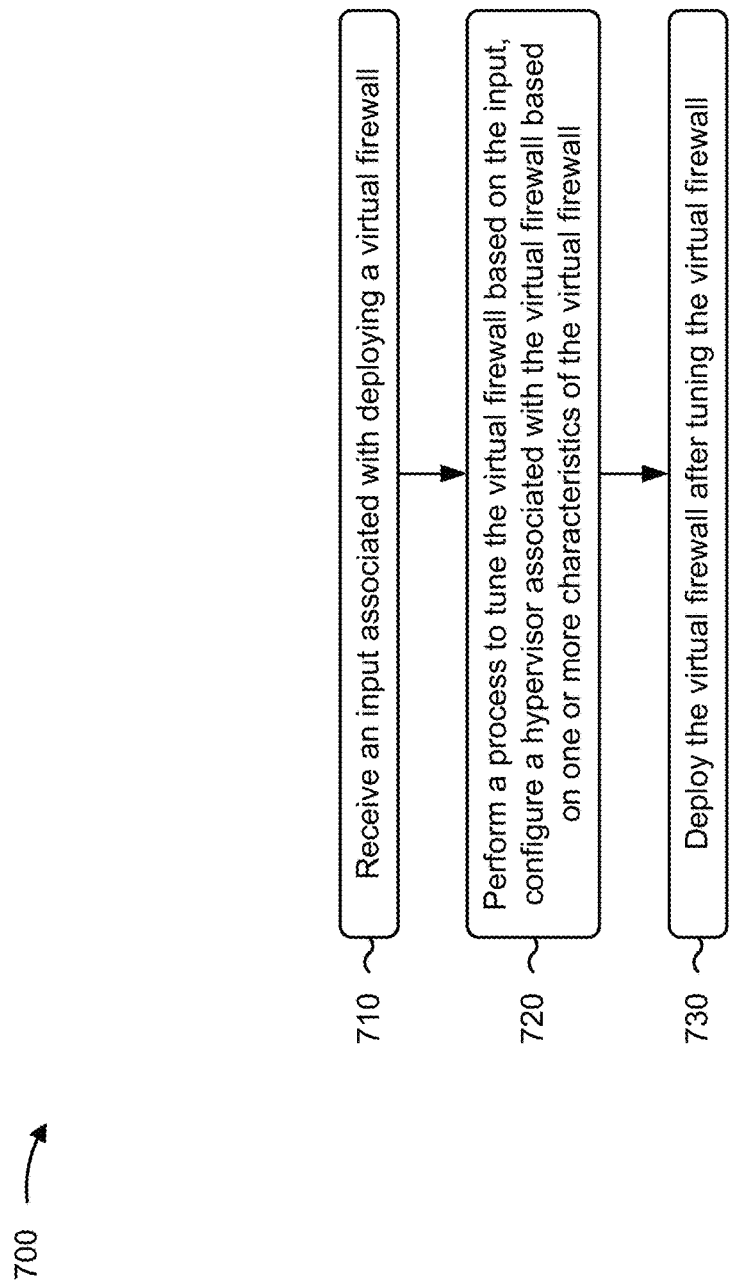

FIG. 7 is a flow chart of an example process 700 for automatically tuning a virtual firewall. In some implementations, one or more process blocks of FIG. 7 may be performed by a device (e.g., host platform 410). In some implementations, one or more process blocks of FIG. 7 may be performed by another device or a group of devices separate from or including the device, such as an endpoint device (e.g., endpoint device 405), and/or the like.

As shown in FIG. 7, process 700 may include receiving an input associated with deploying a virtual firewall (block 710). For example, the device (e.g., using computing resource 415, processor 520, memory 530, storage component 540, input component 550, output component 560, communication interface 570, and/or the like) may receive an input associated with deploying a virtual firewall, as described above.

As further shown in FIG. 7, process 700 may include performing a process to tune the virtual firewall based on the input, configure a hypervisor associated with the virtual firewall based on one or more characteristics of the virtual firewall (block 720). For example, the device (e.g., using computing resource 415, processor 520, memory 530, storage component 540, input component 550, output component 560, communication interface 570, and/or the like) may perform a process to tune the virtual firewall based on the input, as described above.

As further shown in FIG. 7, process 700 may include deploying the virtual firewall after tuning the virtual firewall (block 730). For example, the device (e.g., using computing resource 415, processor 520, memory 530, storage component 540, input component 550, output component 560, communication interface 570, and/or the like) may deploy the virtual firewall after tuning the virtual firewall, as described above.

Process 700 may include additional implementations, such as any single implementation or any combination of implementations described below and/or in connection with one or more other processes described elsewhere herein.

In a first implementation, process 700 includes determining whether non-uniform memory access (NUMA) socket/hyperthreading is enabled, wherein the virtual firewall is being deployed further based on whether the NUMA socket/hyperthreading is enabled.

In a second implementation, alone or in combination with the first implementation, process 700 includes configuring a virtual machine setting associated with the virtual firewall based on the one or more characteristics of the virtual firewall.

In a third implementation, alone or in combination with one or more of the first and second implementations, process 700 includes determining that a plurality of virtual firewalls is to be deployed based on the input, wherein the plurality of virtual firewalls is including the virtual firewall; and enabling a user to set a priority setting for each virtual firewall, of the plurality of virtual firewalls, based on the input indicating that the plurality of virtual firewalls is to be deployed.

In a fourth implementation, alone or in combination with one or more of the first through third implementations, process 700 includes determining that a priority setting associated with the virtual firewall is set to a highest priority setting relative to priority settings associated with other virtual firewalls included in the plurality of virtual firewalls, wherein the process to is tuning the virtual firewall is performed based on the priority setting associated with the virtual firewall being set to the highest priority setting.

In a fifth implementation, alone or in combination with one or more of the first through fourth implementations, process 700 includes determining a failure of a resource availability check associated with deploying the virtual firewall; and modifying a priority setting associated with the virtual machine based on the failure of the resource availability check, wherein the virtual firewall is being to be deployed based on the modified priority setting.

In a sixth implementation, alone or in combination with one or more of the first through fifth implementations, process 700 includes causing the virtual firewall to utilize a multilayer virtual switch that enables virtual networking of virtual machines.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
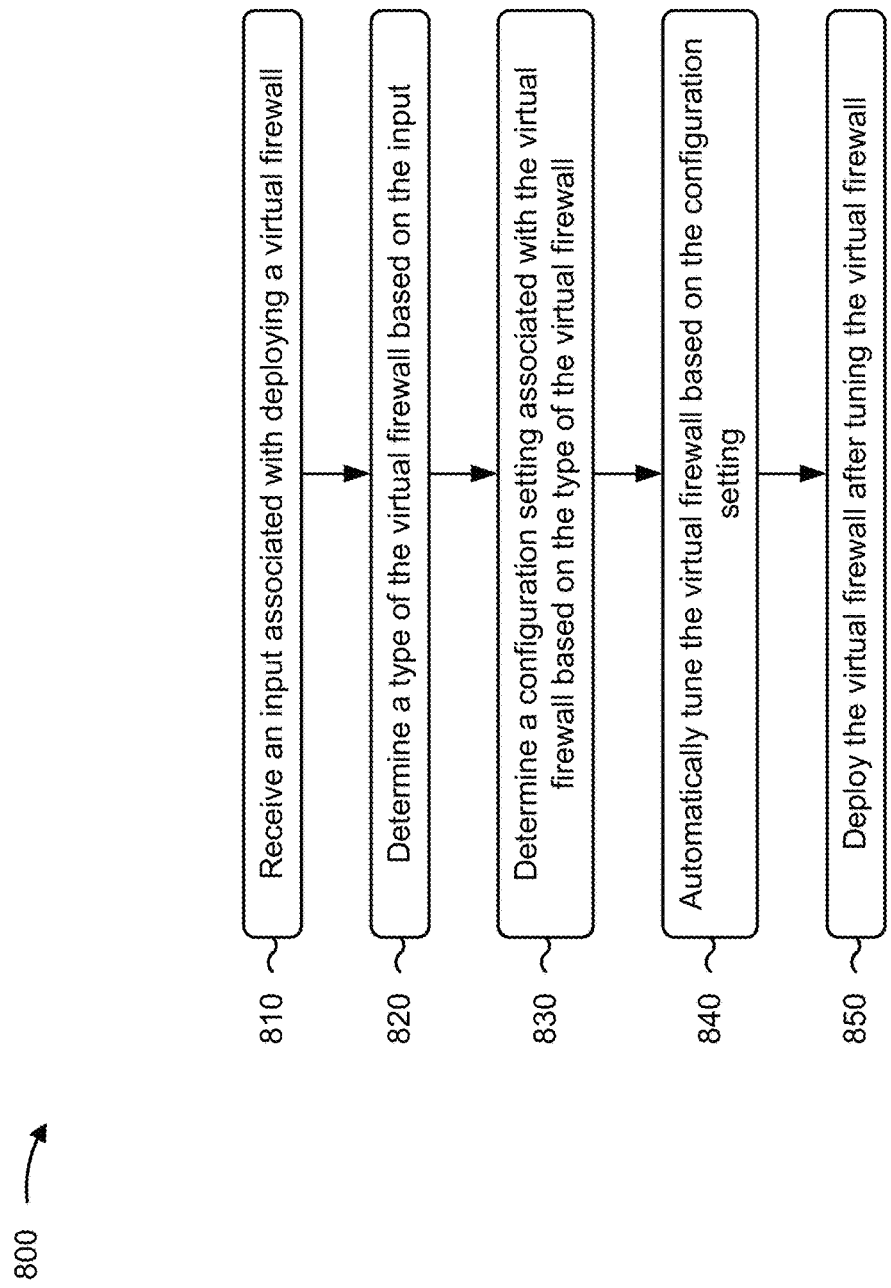

FIG. 8 is a flow chart of an example process 800 for automatically tuning a virtual firewall. In some implementations, one or more process blocks of FIG. 8 may be performed by a device (e.g., host platform 410). In some implementations, one or more process blocks of FIG. 8 may be performed by another device or a group of devices separate from or including the device, such as an endpoint device (e.g., endpoint device 405), and/or the like.

As shown in FIG. 8, process 800 may include receiving an input associated with deploying a virtual firewall (block 810). For example, the device (e.g., using computing resource 415, processor 520, memory 530, storage component 540, input component 550, output component 560, communication interface 570, and/or the like) may receive an input associated with deploying a virtual firewall, as described above.

As further shown in FIG. 8, process 800 may include determining a type of the virtual firewall based on the input (block 820). For example, the device (e.g., using computing resource 415, processor 520, memory 530, storage component 540, input component 550, output component 560, communication interface 570, and/or the like) may determine a type of the virtual firewall based on the input, as described above.

As further shown in FIG. 8, process 800 may include determining a configuration setting associated with the virtual firewall based on the type of the virtual firewall (block 830). For example, the device (e.g., using computing resource 415, processor 520, memory 530, storage component 540, input component 550, output component 560, communication interface 570, and/or the like) may determine a configuration setting associated with the virtual firewall based on the type of the virtual firewall, as described above.

As further shown in FIG. 8, process 800 may include automatically tuning the virtual firewall based on the configuration setting (block 840). For example, the device (e.g., using computing resource 415, processor 520, memory 530, storage component 540, input component 550, output component 560, communication interface 570, and/or the like) may automatically tune the virtual firewall based on the configuration setting, as described above.

As further shown in FIG. 8, process 800 may include deploying the virtual firewall after tuning the virtual firewall (block 850). For example, the device (e.g., using computing resource 415, processor 520, memory 530, storage component 540, input component 550, output component 560, communication interface 570, and/or the like) may deploy the virtual firewall after tuning the virtual firewall, as described above.

Process 800 may include additional implementations, such as any single implementation or any combination of implementations described below and/or in connection with one or more other processes described elsewhere herein.

In a first implementation, process 800 includes determining that a network interface card port associated with the virtual firewall is associated with a non-uniform memory access (NUMA) node associated with the virtual firewall, wherein the virtual firewall is being to be deployed further based on the network interface card port being associated with the NUMA node associated with the virtual firewall.

In a second implementation, alone or in combination with the first implementation, process 800 includes disabling a hyper-threading is functioning based on the type of virtual firewall.

In a third implementation, alone or in combination with one or more of the first and second implementations, process 800 includes causing a physical network interface card and the virtual firewall to be attached to a same non-uniform memory access node.

In a fourth implementation, alone or in combination with one or more of the first through third implementations, process 800 includes utilizing machine learning to determine the configuration setting.

In a fifth implementation, alone or in combination with one or more of the first through fourth implementations, process 800 includes identifying a non-uniform memory access (NUMA) node associated with the virtual firewall; and causing the virtual firewall to be associated with a virtual central processing unit (vCPU) associated with the NUMA node.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    modifying, by a device, a hypervisor setting and a virtual machine setting associated with a virtual machine in connection with deployment of a virtual firewall associated with the virtual machine; and
    deploying, by the device, the virtual firewall after modifying the hypervisor setting and the virtual machine setting.

2. The method of claim 1, wherein modifying the hypervisor setting and the virtual machine setting comprises:
    modifying the hypervisor setting and the virtual machine setting based on characteristics of one or more of:
        the virtual firewall,
        a computing device on which the virtual firewall is to be implemented, or
        a hypervisor.

3. The method of claim 1, wherein modifying the hypervisor setting and the virtual machine setting comprises:
    changing one or more settings from a default value.

4. The method of claim 1, further comprising:
  determining configuration settings associated with increasing performance of the virtual firewall and decreasing latency associated with the virtual firewall relative to the virtual firewall deployed based on current configuration settings.

5. The method of claim 1, wherein deploying the virtual firewall comprises:
  deploying the virtual firewall as a tuned virtual firewall.

6. The method of claim 1, further comprising:
  receiving an input, via a user interface, associated with deploying the virtual firewall.

7. The method of claim 6, wherein the user interface includes one or more of:
  a knob,
  a drop-down menu, or
  a selectable icon.

8. A device, comprising:
  one or more memory devices; and
  one or more processors to:
    modify a hypervisor setting associated with a virtual machine in connection with deployment of a virtual firewall associated with the virtual machine; and
    deploy the virtual firewall associated with the virtual machine after modifying the hypervisor setting.

9. The device of claim 8, wherein the one or more processors are to:
  modify a quantity of virtual central processing units (CPUs) setting to change the quantity of virtual CPUs setting from a default value.

10. The device of claim 8, wherein a hypervisor associated with the hypervisor setting manages the virtual machine.

11. The device of claim 8, wherein the one or more processors, when deploying the virtual firewall, are to:
  deploy the virtual firewall as a tuned virtual firewall,
    wherein the tuned virtual firewall optimizes performance of the virtual firewall.

12. The device of claim 8, wherein the one or more processors are further to:
  modify the hypervisor setting based on one or more characteristics of a hypervisor associated with the hypervisor setting.

13. The device of claim 12, wherein the one or more characteristics of the hypervisor indicate one or more of:
  a boot order associated with the virtual firewall,
  a total amount of memory to be made available to the virtual firewall,
  whether a dynamic memory feature will be enabled,
  a minimum amount of random access memory (RAM) memory to be made available to the virtual firewall,
  a maximum amount of RAM memory to be made available to the virtual firewall,
  a size of a memory buffer associated with an increase in dynamic memory allocation, a memory assignment priority to be assigned to the virtual firewall,
  a quantity of virtual central processing units (CPUs) associated with the virtual firewall,
  a minimum amount of physical CPUs that will be available to the virtual firewall,
  a quantity of non-uniform memory access (NUMA) nodes that will be associated with the virtual firewall, or
  a quantity of sockets that will be associated with the virtual firewall.

14. The device of claim 8, wherein the one or more processors are further to:
  provide a user interface associated with deploying the virtual firewall; and
  receive, via the user interface, an input indicating that the device is to tune the virtual firewall.

15. A non-transitory computer-readable medium storing instructions, the instructions comprising:
  one or more instructions that, when executed by one or more processors of a device, cause the device to:
    provide a user interface associated with deploying a virtual firewall;
    modify a hypervisor setting associated with a virtual machine based on an input received via the user interface; and
    deploy the virtual firewall associated with the virtual machine after modifying the hypervisor setting.

16. The non-transitory computer-readable medium of claim 15, wherein the input is received via a user interface, wherein the user interface includes one or more of:
  a knob,
  a drop-down menu, or
  a selectable icon.

17. The non-transitory computer-readable medium of claim 15, wherein the one or more instructions further cause the device to:
  modify the hypervisor setting based on one or more characteristics of a hypervisor associated with the hypervisor setting,
    wherein the one or more characteristics of the hypervisor indicate a total amount of memory to be made available to the virtual firewall.

18. The non-transitory computer-readable medium of claim 15, wherein the one or more instructions further cause the device to:
  deploy the virtual firewall as a tuned virtual firewall,
    wherein the tuned virtual firewall optimizes performance of the virtual firewall.

19. The non-transitory computer-readable medium of claim 15, wherein the one or more instructions further cause the device to:
  change one or more settings from a default value.

20. The non-transitory computer-readable medium of claim 15, wherein the one or more instructions further cause the device to:
  receive, via the user interface, the input indicating that the device is to tune the virtual firewall.

* * * * *